US012743668B2

(12) United States Patent
D'Agostino et al.

(10) Patent No.: US 12,743,668 B2
(45) Date of Patent: Sep. 22, 2026

(54) COORDINATED SCHEDULING FOR ON CALL EVENTS

(71) Applicant: DOC BUDDY INC., Greenwood Village, CO (US)

(72) Inventors: Philip A. D'Agostino, Greenwood Village, CO (US); Jason A. Dell, Highlands Ranch, CO (US); Ashley A. Bye, St. Louis Park, MN (US)

(73) Assignee: DOC BUDDY INC., Greenwood Village, CO (US)

( * ) Notice: Subject to any disclaimer, the term of this patent is extended or adjusted under 35 U.S.C. 154(b) by 62 days.

(21) Appl. No.: 18/508,854

(22) Filed: Nov. 14, 2023

(65) Prior Publication Data

US 2024/0161031 A1 May 16, 2024

Related U.S. Application Data

(60) Provisional application No. 63/425,611, filed on Nov. 15, 2022.

(51) Int. Cl.
*G06Q 10/0631* (2023.01)

(52) U.S. Cl.
CPC .......................... *G06Q 10/063118* (2013.01)

(58) Field of Classification Search
CPC .......................................... G06Q 10/063118
USPC .................................................... 705/7.17
See application file for complete search history.

(56) References Cited

U.S. PATENT DOCUMENTS

| | | | |
|---|---|---|---|
| D297,243 | S | 8/1988 | Verplank et al. |
| D391,558 | S | 3/1998 | Marshall et al. |
| D392,962 | S | 3/1998 | Kontiainen |
| D418,826 | S | 1/2000 | Anderson et al. |
| D423,483 | S | 4/2000 | Hodgson |
| D423,484 | S | 4/2000 | Dangelmaier et al. |
| 6,304,897 | B1 | 10/2001 | Venkatraman et al. |
| D467,935 | S | 12/2002 | Coleman |
| 6,907,580 | B2 | 6/2005 | Michelman et al. |
| D656,508 | S | 3/2012 | Makhlouf |

(Continued)

OTHER PUBLICATIONS

"Online Scheduling System for Doctors and Patients in a Hospital" Published by Proceeding of the International Conference on Industrial Engineering and Operations Management Monterrey (Year: 2021).*

(Continued)

*Primary Examiner* — Zeina Elchanti
(74) *Attorney, Agent, or Firm* — Dorsey & Whitney LLP

(57) ABSTRACT

An example method for generating and coordinating a centralized on call schedule showing on call events includes receiving, at an on call coordination system, a request from a user device to view an on call schedule associated with an identifier and querying, by the on call coordination system, schedule data for on call events using the identifier received with the request. The method further includes configuring the on call schedule based on the on call events received from the schedule data responsive to the query, where the on call schedule is further configured based on a characteristic associated with the user device. The method further includes configuring the on call schedule according to a user interface configuration. The method further includes transmitting the configured schedule to the user device.

18 Claims, 9 Drawing Sheets

(56) References Cited

U.S. PATENT DOCUMENTS

| | | | |
|---|---|---|---|
| D677,685 | S | 3/2013 | Simmons et al. |
| D683,762 | S | 6/2013 | Salama et al. |
| D789,979 | S | 6/2017 | Christiana et al. |
| D790,580 | S | 6/2017 | Hatzikostas |
| D810,129 | S | 2/2018 | Chaudhri et al. |
| D822,042 | S | 7/2018 | Pinzon Garcia et al. |
| D885,414 | S | 5/2020 | Bilancio et al. |
| 2014/0108022 | A1* | 4/2014 | Schoenberg ......... G06Q 30/016 705/2 |
| 2022/0261706 | A1* | 8/2022 | Takhar ................... G06Q 10/02 |

OTHER PUBLICATIONS

Dashboard UI Calendar—Shumara, https://dribbble.com/shots/10840618-Dashboard-UI-Calendar (Year: 2020).

Monthly Calendar view—Spark, https://uigarage.neUmonthly-calendar-view-by-spark-on-macos/ (Year: 2019).

Nhn tui calendar A JavaScript calendar that has everything you need—GitHub, https://github.com/nhn/tui.calendar?tab=readme-ov-file#-documents (Year: 2022).

* cited by examiner

200
Memory
202
Static Storage
204
Dynamic Storage
206
Bus 210
Data Interface
212
Processor(s)
208
Communications
Interface
216
Communications Link
218
Database
214
I/O Interface
220

Figure 5:
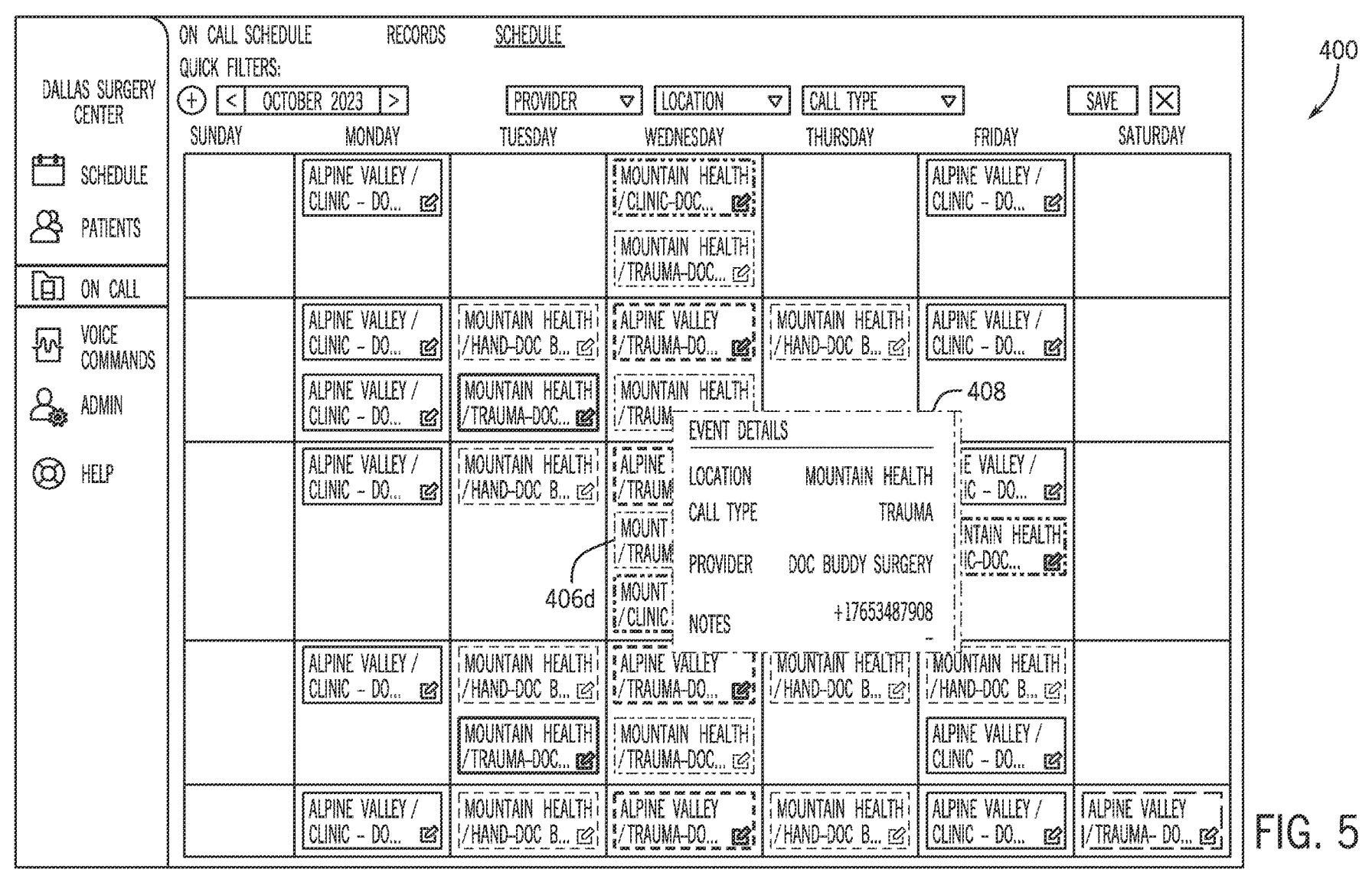

400

DALLAS SURGERY CENTER
SCHEDULE
PATIENTS
ON CALL
VOICE COMMANDS
ADMIN
HELP

ON CALL SCHEDULE RECORDS SCHEDULE

QUICK FILTERS:
< OCTOBER 2023 >
PROVIDER
LOCATION
CALL TYPE
SAVE

SUNDAY MONDAY TUESDAY WEDNESDAY THURSDAY FRIDAY SATURDAY

ALPINE VALLEY / CLINIC - DO...
MOUNTAIN HEALTH /HAND-DOC B...
MOUNTAIN HEALTH /TRAUMA-DOC...
MOUNTAIN HEALTH /CLINIC-DOC...
ALPINE VALLEY /TRAUMA-DO...

EVENT DETAILS
LOCATION MOUNTAIN HEALTH
CALL TYPE TRAUMA
PROVIDER DOC BUDDY SURGERY
NOTES +17653487908

COORDINATED SCHEDULING FOR ON CALL EVENTS

This application claims the benefit of priority under 35 USC § 119(e) of U.S. Provisional Patent Application No. 63/425,611 filed Nov. 15, 2022 and entitled "Coordinated Scheduling For On Call Events," which is hereby incorporated by reference in its entirety.

BACKGROUND

Physicians and other providers are often on call at various medical facilities, such as hospitals, on irregular schedules. Schedules showing which providers are on call are often manually maintained by medical practices and medical facilities. Such schedules may be difficult to maintain, using significant time from administrators to maintain on call schedules. Further, it may be difficult for providers to determine when they are scheduled for on call events and for personnel at medical facilities to determine which providers are on call.

SUMMARY

An example method for generating and coordinating a centralized on call schedule of on call providers showing on call events is disclosed. The method includes receiving, at an on call coordination system, a request from a user device to view an on call schedule associated with an identifier, where the identifier may be associated with one or more medical providers, one or more medical practices, one or more clinics, one or more on call locations, or a time and date range. The method further includes querying, by the on call coordination system, schedule data for on call events using the identifier received with the request, where the schedule data centrally stores on call events associated with one or more medical providers, one or more medical practices, one or more clinics, or one or more on call locations. The method further includes configuring the on call schedule based on the on call events received from the schedule data responsive to the query, where the on call schedule is further configured based on a characteristic associated with the user device. The method further includes configuring the on call schedule according to a user interface configuration which may format the on call schedule according to characteristics of the user device, access and permission settings of the user and the manner in which the user device is connected to the on call coordination system. The method further includes transmitting the configured schedule to the user device.

One or more example non-transitory computer readable media are encoded with instructions which, when executed by one or more processors of an on call coordination system, cause the on call coordination system to receive a request from a user device to view an on call schedule associated with an identifier and query schedule data for on call events using the identifier received with the request. The instructions further cause the on call coordination system to configure the on call schedule based on the on call events received from the schedule data responsive to the query, where the on call schedule is further configured based on a characteristic associated with the user device and transmit the configured schedule to the user device.

An example system for generating and coordinating a centralized on call schedule of medical providers is disclosed. The system includes a schedule data storage system for storing a plurality of on call events and schedules assembled from one or more medical practices, clinics, on call locations, or medical providers. The system further includes one or more computing resources. The computing resources include a non-transitory memory component for storing a plurality of clinic data, on call location data, and provider data. The computing resource further includes one or more processors in electronic communication with the memory and configured by instructions from the memory to perform operations. The operations include receiving a request from a user device to view an on call schedule associated with at least one identifier. The operations further include querying schedule data for call events using the identifier which may be associated with one or more medical providers, one or more medical practices, one or more clinics, one or more on call locations, or a time and date range. The operations further include configuring the on call schedule based on the on call events received from the schedule data responsive to the query, where the on call schedule is further configured based on a characteristic associated with the user device. The operations further include configuring the on call schedule according to a user interface configuration which may format the on call schedule according to characteristics of the user device, access and permission settings of the user and the manner in which the user device is connected to the on call coordination system. The operations further include transmitting the configured schedule to the user device Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that:

FIG. 5 shows an example user interface showing an on call schedule in accordance with various embodiments of the disclosure.

DETAILED DESCRIPTION

Figure 1:
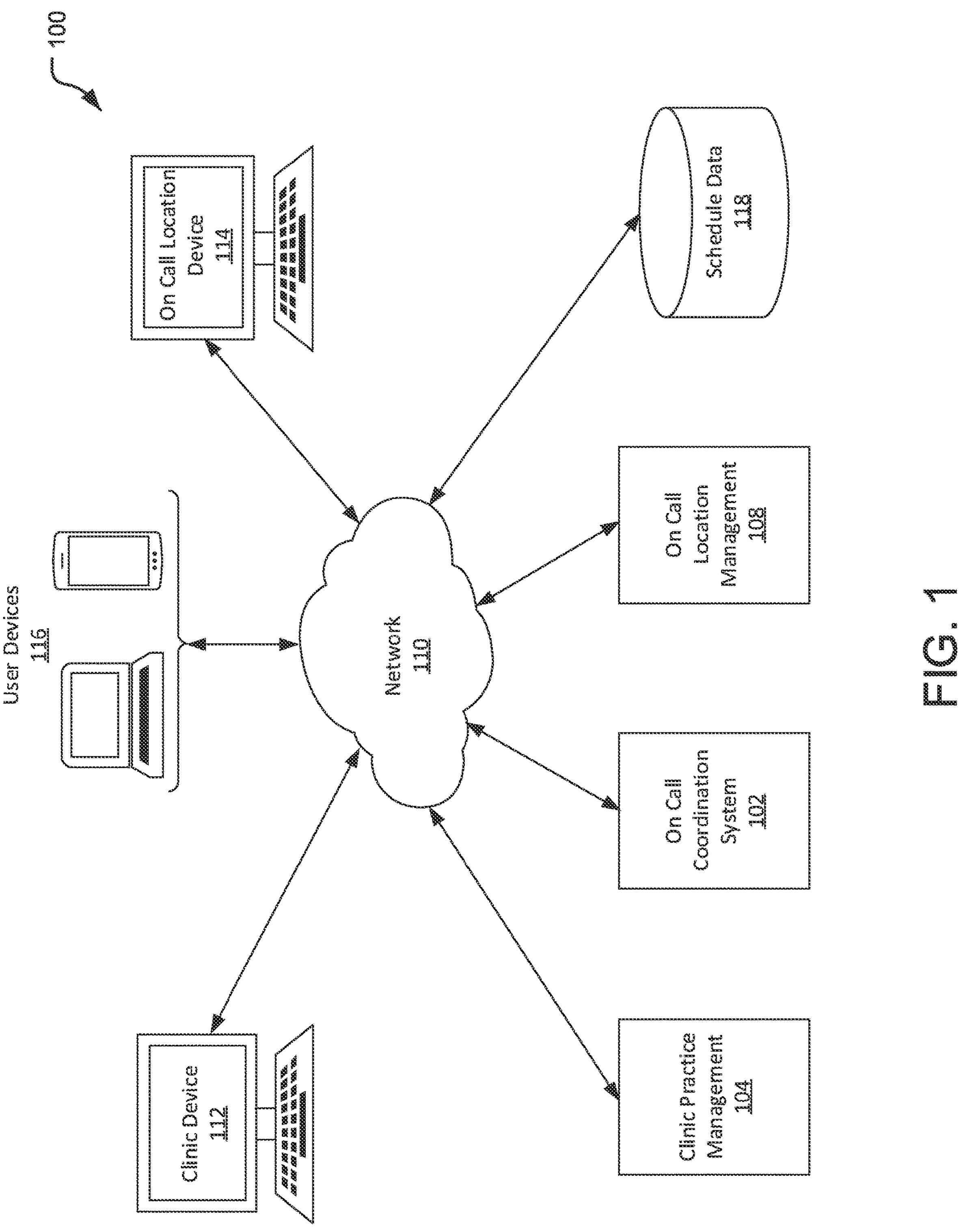
FIG. 1 illustrates an example on call coordination system and various systems in communication with the on call coordination system through a network, in accordance with various embodiments of the disclosure.

An on call coordination system described herein may centralize and coordinate scheduling of on call shifts between various on call locations, medical providers, and medical practices. On call locations, such as hospitals, may place physicians or other medical providers on call (e.g., to be available at certain times to address issues which may arise concerning the provider's specialty). For example, a hospital may keep a physician experienced in trauma on call in the event a patient arrives at the hospital needing trauma care. Such on call shifts or events are often covered by various medical groups or practices, which may schedule their respective providers for on call shifts for the on call location. Frequently, several medical groups or practices may combine efforts to cover the needs of an on call location, with the medical groups splitting up on call shifts in any given time period. Accordingly, when on call scheduling is completed by such practices, it can be difficult for personnel at the on call location to determine which providers are on call in a given time period. For example, a hospital may receive a static schedule or paper schedules from several different practices, and hospital personnel may have to consult several such schedules to determine if a provider is on call. Personnel may need to consult additional documents to locate contact information for the provider on call. In these situations, it may further be difficult for a hospital or other on call location to determine if all on call shifts are covered for a specific specialty.

Static or paper scheduling may also present challenges within a medical practice. For example, providers of a medical practice may cover on call shifts for several different on call locations, and schedules may be created for each location. Such schedules may need to be cross checked to ensure that providers are not scheduled for multiple on call shifts at one time. Further, changing on call schedules may require updating a paper or static on call schedule with new provider information and disseminating the updated schedule to providers and to on call locations. Having multiple versions of on call schedules may create further confusion as some personnel may consult a previous version of a schedule and may have difficulty contacting a provider when needed.

Standard electronic schedules or calendars (e.g., Outlook® or Google Calendar®) may also present challenges within a medical practice. For example, different clinics and on call locations may be required to maintain separate electronic calendars for on call shifts. Providers who are scheduled for on call shifts across multiple clinics or on call locations may need to refer to multiple separate electronic calendars which may lead to confusion and mistakes regarding the providers' understanding of the totality of the on call shifts that they are scheduled for. Furthermore, different clinics or on call locations may utilize separate databases and servers; traditional electronic schedules or calendars may not allow for communication across such different systems. Thus, a single clinic or on call location cannot accurately assess a provider's availability since the clinic or on call location may not have access to all the electronic calendars containing the provider's schedule and thus cannot determine whether the provider is scheduled with another clinic or on call location at any given time. Furthermore, traditional electronic schedules and calendars may not have the adequate privacy and security measures to sufficiently protect any patient electronic medical records which may be incorporated into an on call schedule.

The on call coordination system described herein creates a centralized on call schedule for coordination between multiple medical practices or clinics, on call locations, and providers. The on call coordination system facilitates communication and data transfer between multiple systems, servers, and databases which allows for the coordination of on call schedules across multiple organizations and providers. The on call coordination system may automatically update schedules at other locations with any changes, reducing time spent by administrators creating schedules and confusion created by having multiple versions of an on call schedule in circulation. The on call coordination system may further allow users to view schedules of multiple entities at once. For example, a user at a medical practice or clinic may view an on call schedule including on call events at multiple on call locations. Similarly, a user at an on call location may view an on call schedule including on call events covered by providers from multiple medical practices or clinics. Accordingly, the on call coordination system may reduce confusion associated with on call scheduling and may simplify the on call scheduling process for both on call locations and medical practices.

Various embodiments of the present disclosure will be explained below in detail with reference to the accompanying drawings. Other embodiments may be utilized, and structural, logical and electrical changes may be made without departing from the scope of the present disclosure. Turning now to the drawings, FIG. 1 illustrates an example on call coordination system 102 and various systems in communication with the on call coordination system 102. For example, the on call coordination system 102 may be in communication with a clinic practice management system 104, an on call location management system 108, and schedule data 118 via a network 110. The on call coordination system 102 may further provide data (e.g., on call schedules) to and receive data (e.g., requests to generate new on call events) from a clinic device 112, on call location device 114, and/or various user devices 116, such as provider devices used by providers, through the network 110. Accordingly, the on call coordination system 102 may be used to maintain on call schedules for medical practices (e.g., clinics), providers, and on call locations such as hospitals, urgent care centers, and the like. Coordination of on call schedules may reduce time spent coordinating on call schedules and confusion associated with errors in on call schedules which are separately maintained by providers, clinics, and on call locations. Further such coordinated schedules may be updated more quickly and accurately, leading to more efficient and higher quality medical care. When an on call schedule is not accurate, an on call location may have difficulties contacting a provider who is on call when the on call provider is needed, leading to delayed medical care. For example, the wrong provider may be listed as being on call, contact information for an on call provider may not be up to date, and/or the schedule may have other inaccuracies delaying care for patients needing care from the on call provider.

In various examples, the on call coordination system 102 may be generally implemented by a computing device or combinations of computing resources in various embodiments. In various examples, the on call coordination system 102 may be implemented by one or more servers, cloud computing resources, and/or other computing devices. The on call coordination system 102 may, for example, utilize various processing resources to receive on call event requests, create new on call events, generate on call schedules for specific medical practices, on call locations, and/or providers, and the like. The on call coordination system 102 may further include memory and/or storage locations to store program instructions for execution by the processor and various data utilized by the on call coordination system 102.

Clinic practice management 104 and on call location management 108 may similarly be implemented by one or more computing devices or combinations of computing resources in various embodiments. Each of clinic practice management 104 and on call location management 108 may be medical management systems utilized by a clinic, provider group, hospital, urgent care location, or other organizations for management of various tasks such as scheduling, record management, and the like. Such medical management systems may communicate with various entities using the network 110.

The network 110 may be implemented using one or more of various systems and protocols for communications between computing devices. In various embodiments, the network 110 or various portions of the network 110 may be implemented using the Internet, a local area network (LAN), a wide area network (WAN), and/or other networks. In additional to traditional data networking protocols, in some embodiments, data may be communicated according to protocols and/or standards including near field communication (NFC), Bluetooth, cellular connections, and the like.

In various examples, the clinic device 112 and/or the on call location device 114 may have access to one or more medical management systems (e.g., clinic practice management 104, on call location management 108, and the like) and/or the on call coordination system 102. For example, the clinic device 112 may communicate with clinic practice management 104 to schedule an on call event and clinic practice management 104 may communicate the request to the on call coordination system 102. The on call coordination system 102 may then establish a new on call event corresponding to the request and may provide information about the on call event to on call location management 108. In some examples, the clinic device 112 and/or the on call location device 114 may communicate directly with the on call coordination system 102 to create on call events, view on call schedules, edit existing on call events, and the like. In some examples, the on call coordination system 102 may communicate with clinic devices 112, on call location devices 114 or medical management systems from different organizations or databases, coordinating a centralized on call schedule between multiple clinics and on call locations.

Generally, the user devices 116 may communicate with the on call coordination system 102 to view, create, and/or edit on call events. For example, some user devices 116 may be mobile devices owned by individual providers, which providers may utilize to access on call schedules for themselves (e.g., on call events associated with their provider identifier) from the on call coordination system 102. Other user devices may be associated with other users, such as medical staff at an on call location, who may access the on call coordination system 102 to obtain information about providers who are on call for the on call location. For example, a charge nurse may have a user device 116 which may access the on call coordination system 102 to determine which provider or practice is on call for a particular specialty.

In various implementations, the user devices 116, the clinic device 112, the on call location device 114 and/or additional user devices may be implemented using any number of computing devices including, but not limited to, a computer, a laptop, tablet, mobile phone, smart phone, wearable device (e.g., AR/VR headset, smart watch, smart glasses, or the like), smart speaker, vehicle (e.g., automobile), or other smart devices. Generally, the user devices may include one or more processors, such as a central processing unit (CPU) and/or graphics processing unit (GPU). The user devices 116 may generally perform operations by executing executable instructions (e.g., software) using the processor(s).

Schedule data 118 and/or other data storage locations may be accessible by the on call coordination system 102 via the network 110. In some examples, schedule data 118 may be local to the on call coordination system 102. In some examples, schedule data 118 may be implemented using cloud or other types of storage remote from the on call coordination system 102. Schedule data 118 may include information about various on call events managed by the on call coordination system 102. For example, schedule data 118 may store a database of on call events, where each on call event is associated with various identifiers. For example, an on call event may be associated with an on call location identifier, which may be associated with a facility (e.g., a hospital or urgent care location) for which a provider is on call during the on call event. An on call event may be further associated with a provider identifier for the provider who is on call during the event and one or more practice identifiers for practices or clinics with which the provider is associated.

In various examples, schedule data 118 may include additional information associated with individual on call events, such as a date and time for the event, a specialty associated with the event, and the like. For example, on call events stored in the schedule data 118 may include variables or identifiers which identify the date and time, specialty, and other information for the specific on call event. In some examples, on call events may further be associated with or reference other on call events, which may be a part of the same series or grouping of on call events. For example, a series of on call events may include on call events having the same characteristics and identifiers (e.g., the same provider, hospital, and specialty), but on different dates or at different times. On call events in a series may occur at regular intervals (e.g., the first Saturday of every month from 3 PM-12 AM) or at irregular intervals (e.g., at different times, different days of the week, and the like).

Components of the on call coordination system 102 and components in communication with the on call communication system 102 shown in FIG. 1 are exemplary and may vary in some embodiments. For example, in some embodiments, the on call coordination system 102 may be distributed across multiple computing elements, such that components of the on call coordination system 102 communicate with one another through the network 110. Further, in come embodiments, computing resources dedicated to the on call coordination system 102 may vary over time based on various factors such as usage of the on call coordination system 102.

Though the on call coordination system 102 is shown in communication with one clinic practice management system 104 and one on call location management system 108, the on call coordination system 102 may, in various examples, be in communication with various other practice management systems. For example, the on call coordination system 102 may be in communication with clinic practice management systems for multiple practices and/or clinics which share on call responsibilities for a particular on call location. Accordingly, the on call location may utilize the on call coordination system 102 to create and view complete on call schedules including on call events for providers associated with multiple practices. Similarly, the on call coordination system 102 may be in communication with multiple on call location management systems such that a clinic, medical practice, or other association of providers may utilize the on call coordination system 102 to create and view complete on call schedules including all on call locations serviced by providers in the clinic or practice.

The on call coordination system 102 may be in communication with additional services or software components utilized for other functions of the on call coordination system 102. For example, the on call coordination system 102 may utilize an authentication service to authenticate users accessing the on call coordination system 102 to create and/or view on call events. Such authentication may also be used to determine permissions granted to various users, which may affect the actions available to a user within the on call coordination system 102. For example, an administrative user associated with a medical practice may only be able to view or request on call events for providers also associated with the practice. In some examples, users associated with a hospital or other on call location may have permissions to view on call events for the hospital, but not to edit or add on call events to the on call coordination system 102.

Figure 2:
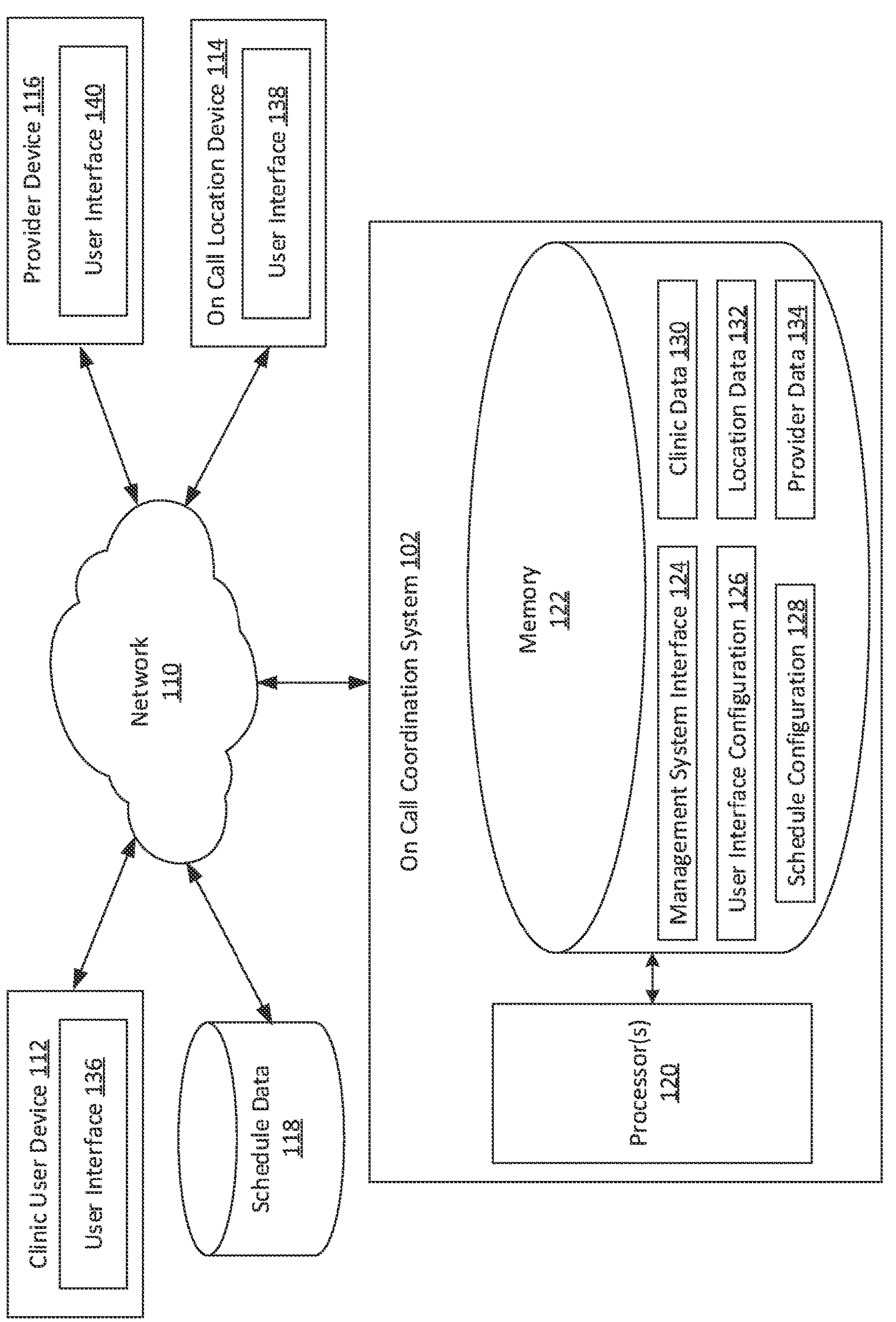
FIG. 2 illustrates an example on call coordination system in accordance with various embodiments of the disclosure.

FIG. 2 illustrates an example on call coordination system 102 in accordance with various embodiments of the disclosure. The on call coordination system 102 may communicate via the network 110 with various components or services, such as a clinic user device 112, a provider device 116, and/or an on call location device 114. The clinic user device 112, provider device 116, and on call location device 114 may generally access the on call coordination system 102 to create new on call events, edit or otherwise update existing on call events, view existing on call schedules, and the like. The on call coordination system 102 may further communicate with various storage locations to store and/or access data. For example, schedule data 118 may be stored and accessed from such a storage location.

The on call coordination system 102 may further communicate with various management systems, such as management systems associated with clinics, medical practices, and the like. For example, the on call coordination system 102 may communicate with multiple medical practice management systems and multiple on call location management systems, such that the on call coordination system 102 allows an on call location to coordinate an on call schedule including providers associated with different medical practices and allows a medical practice to coordinate on call schedules with multiple on call locations.

In various implementations, the on call coordination system 102 may include or utilize one or more hosts or combinations of compute resources, which may be located, for example, at one or more servers, cloud computing platforms, computing clusters, and the like. Generally, the on call coordination system 102 is implemented by compute resources including hardware for memory 122 and one or more processors 120. For example, the on call coordination system 102 may utilize or include one or processors, such as a CPU, GPU, and/or programmable or configurable logic. In some embodiments, various components of the on call coordination system 102 may be distributed across various computing resources, such that the components of the on call coordination system 102 communicate with one another through the network 110 or using other communications protocols. For example, in some embodiments, the on call coordination system 102 may be implemented as a serverless service, where computing resources for various components of the on call coordination system 102 may be located across various computing environments (e.g., cloud platforms) and may be reallocated dynamically and/or automatically according to, for example, resource usage of the on call coordination system 102. In various implementations, the on call coordination system 102 may be implemented using organizational processing constructs such as functions implemented by worker elements allocated with compute resources, containers, virtual machines, and the like.

The memory 122 may include instructions for various functions of the on call coordination system 102 which, when executed by the processor 120, perform various functions of the on call coordination system 102. The memory 122 may further store data and/or instructions for retrieving data used by the on call coordination system 102. Similar to the processor 120, memory resources utilized by the on call coordination system 102 may be distributed across various physical computing devices. In some examples, memory 122 may access instructions and/or data from other devices or locations, such as schedule data 118, and such instructions and/or data may be read into memory 122 to implement the on call coordination system 102.

In various embodiments, memory 122 may store clinic data 130. Clinic data may include, for example, practice or clinic identifiers associated with clinics and/or provider groups. Such data may further include provider identifiers for providers associated with the provider group and/or identifiers for on call locations which the provider group services. In some examples, clinic data 130 may further include permissions specific to a clinic, such as identifiers for administrative users with permission to access on call events associated with the clinic identifier, create new on call events associated with the clinic identifier, and/or edit existing on call events associated with the clinic identifier. Certain users, including providers and/or administrative users, may further have customized permission to access full schedules for a clinic or medical practice and to share a schedule with another entity, such as an on call location. In some examples, clinic data 130 may further include settings for users not associated with the clinic or practice identifier who have been granted access to a schedule including on call events associated with the clinic. For example, users associated with a particular on call location may have permission to view on call events, but not to edit or update on call events associated with the clinic or practice.

In various embodiments, memory 122 may store location data 132. Location data 132 may, in various examples, include an identifier for an on call location, practice or clinic identifiers for medical practices servicing the on call location, and/or provider identifiers for providers servicing the on call location. Location data 132 may further include information about the on call needs of the on call location, such as hours of operation, specific specialties that should be on call, and the like. For example, a pediatric hospital may have different specialty needs than a general hospital. Location data 132 may further include information (e.g., account information) for various users associated with the on call location with access to the on call coordination system 102. For example, charge nurses may have full access to view on call schedules for the on call location.

Memory 122 may store provider data 134 in various embodiments. Provider data 134 may include provider identifiers, clinic or medical practice identifiers for practices that a provider is associated with, on call location identifiers for on call locations serviced by the provider, and the like. Provider data 134 may further include one or more specialties of the provider, contact information for the provider, and/or general availability for the provider. For example, contact information may include the provider's mobile phone number, back up contact information for clinic personnel able to contact the provider, and the like. General availability may include periods of time when the provider is not available to be on call, such as requested and planned vacations. Provider data 134 may further include information about user accounts used by providers to access the on call coordination system 102 and permissions associated with such user accounts. For example, permissions may include the ability to access and/or update on call events, on call schedules, request trades in on call events with other providers, and the like. Provider data 134 may be organized into provider profiles that may be used when assessing and assigning on call events. Provider data 134 may be updated through information received from clinic devices 112, on call location devices 114, user devices 116, and/or various management systems, such as clinic practice management 104 and/or on call location management 108.

In various embodiments, the memory 122 may store instructions implementing a management system interface 124 when executed by the processor 120. The management system interface 124 may generally include instructions for interfacing and/or communicating with various management systems, such as clinic practice management 104 and/or on call location management 108. In various examples, clinic practice management 104 and/or on call location management 108 may communicate with the on call coordination system 102 to create on call events, view on call events, edit or update existing on call events, and the like. For example, clinic devices 112 and on call location devices 114 may communicate with the on call coordination system 102 via clinic practice management 104 and on call location management 108, respectively, in various examples. Clinic practice management 104 and/or on call location management 108 may further communicate with the on call coordination system 102 to update and/or provide data to the on call coordination system 102, such as updated listings of providers associated with a clinic, updated on call needs for an on call location and the like.

The management system interface 124 may accordingly communicate with other components of the on call coordination system 102, including accessing data stored at the memory 122 of the on call coordination system 102 and/or schedule data 118 managed by and accessible by the on call coordination system 102. For example, the management system interface 124 may update provider data 134, clinic data 130, and location data 132 when receiving a request to add a provider associated with a medical practice from a clinic practice management system 104. For example, when a new provider is added to a medical practice, provider data 134 may be updated to add a provider identifier, contact information, and specialties associated with the provider, and clinic data 130 and location data 132 may be updated to add the provider identifier as being associated with the practice or clinic and the on call location.

In various embodiments, the memory 122 may store instructions implementing schedule configuration 128 when executed by the processor 120. Schedule configuration 128 may generally communicate with schedule data 118 to create new on call events, edit or update existing on call events, retrieve information about existing on call events, and the like. For example, when a new on call event is created, schedule configuration 128 may add the on call event to schedule data 118, along with any information or data associated with the on call event (e.g., provider identifier, practice identifier, on call location identifier, date and time of the on call event, specialty of the on call event, whether the on call event is part of a series, and the like.

Schedule configuration 128 may further communicate with clinic data 130, location data 132, provider data 134, and/or schedule data 118 to fulfill requests for on call schedules. For example, a clinic administrator may request to view an on call schedule for the month of November for a clinic. Schedule configuration 128 may, given the clinic identifier, query schedule data 118 for any on call events associated with the clinic with dates in the month of November.

In various embodiments, the memory 122 may store instructions implementing user interface configuration 126 when executed by the processor 120. User interface configuration 126 may generally communicate with other components of the on call coordination system to present user interfaces to various user devices (e.g., clinic device 112, on call location device 114, and/or user devices 116) to receive information and input regarding on call events and to generate on call schedules for viewing at such user devices. In some examples, user interface configuration 126 may configure on call schedules and/or user interfaces for input based on one or more characteristics of the user device and/or permissions for the user account requesting information or providing input. For example, an on call schedule may be formatted differently for a user requesting the schedule from a mobile device than for a user requesting the schedule through a desktop computer.

The clinic user device 112, on call location device 114, and provider device 116 may each include user interfaces 136, 138, and 140 respectively, which may be utilized to provide information to and/or receive information from user interface configuration 126. For example, user interface configuration 126 may present an interface for requesting an on call schedule or for creating a new on call event via such user interfaces, and may receive input for performing such tasks from the user interfaces. User interface configuration 126 may further present on call schedules via the user interfaces 136, 138, and 140 responsive to such requests.

Figure 3:
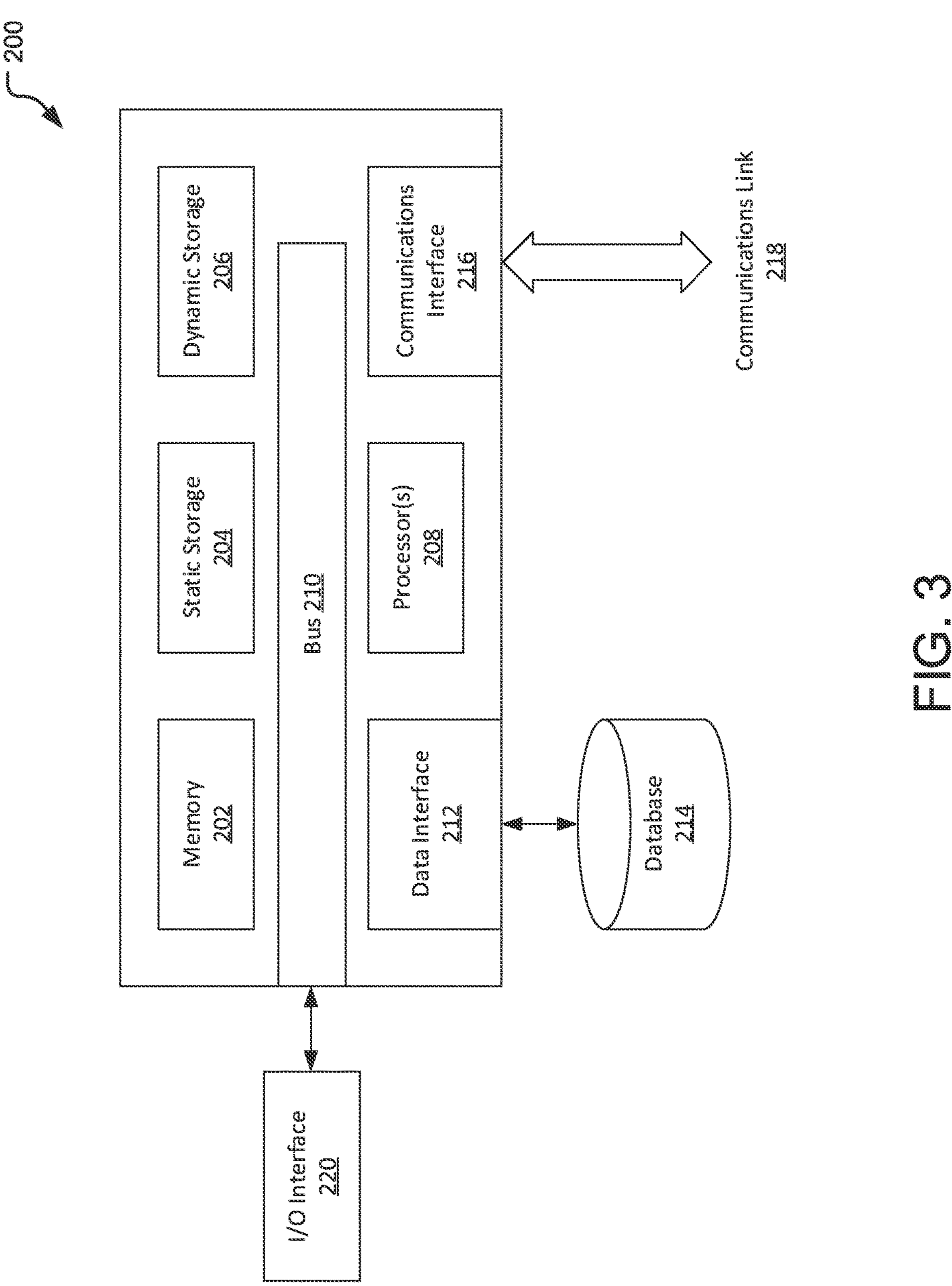
FIG. 3 is a schematic diagram of an example computer system implementing various embodiments in the examples described herein.

The on call coordination system 102 may be implemented using various computing systems. Turning to FIG. 3, an example computing system 200 may be used for implementing various embodiments in the examples described herein. For example, processor 120 and memory 122 may be located at one or several computing systems 200. In various embodiments, user device 116 is also implemented by a computing system 200. Various medical management systems, such as clinic practice management 104 and on call location management 108 may also be implemented by one or several computing systems 200. This disclosure contemplates any suitable number of computing systems 200. For example, the computing system 200 may be a server, a desktop computing system, a mainframe, a mesh of computing systems, a laptop or notebook computing system, a tablet computing system, an embedded computer system, a system-on-chip, a single-board computing system, or a combination of two or more of these. Where appropriate, the computing system 200 may include one or more computing systems; be unitary or distributed; span multiple locations; span multiple machines; span multiple data centers; or reside in a cloud, which may include one or more cloud components in one or more networks.

Computing system 200 includes a bus 210 (e.g., an address bus and a data bus) or other communication mechanism for communicating information, which interconnects subsystems and devices, such as processor 208, memory 202 (e.g., RAM), static storage 204 (e.g., ROM), dynamic storage 206 (e.g., magnetic or optical), communications interface 216 (e.g., modem, Ethernet card, a network interface controller (NIC) or network adapter for communicating with an Ethernet or other wire-based network, a wireless NIC (WNIC) or wireless adapter for communicating with a wireless network, such as a WI-FI network), and/or input/output (I/O) interface 220 (e.g., keyboard, keypad, mouse, microphone). In particular embodiments, the computing system 200 may include one or more of any such components.

In particular embodiments, processor 208 includes hardware for executing instructions, such as those making up a computer program. The processor 208 circuity includes circuitry for performing various processing functions, such as executing specific software or performing specific calculations or tasks. In particular embodiments, I/O interface 220 includes hardware, software, or both, providing one or more interfaces for communication between computing system 200 and one or more I/O devices. Computing system 200 may include one or more of these I/O devices, where appropriate. One or more of these I/O devices may enable communication between a person and computing system 200.

In particular embodiments, communications interface 216 includes hardware, software, or both providing one or more interfaces for communication (such as, for example, packet-based communication) between computing system 200 and one or more other computer systems or one or more networks. One or more memory buses (which may each include an address bus and a data bus) may couple processor 208 to memory 202. Bus 210 may include one or more memory buses, as described below. In particular embodiments, one or more memory management units (MMUs) reside between processor 208 and memory 202 and facilitate accesses to memory 202 requested by processor 208. In particular embodiments, bus 210 includes hardware, software, or both coupling components of computing system 200 to each other.

According to particular embodiments, computing system 200 performs specific operations by processor 208 executing one or more sequences of one or more instructions contained in memory 202. For example, instructions for the management system interface 124 and user interface configuration 126 may be contained in memory 202 and may be executed by the processor 208. Such instructions may be read into memory 202 from another computer readable/usable medium, such as static storage 204 or dynamic storage 206. In alternative embodiments, hard-wired circuitry may be used in place of or in combination with software instructions. Thus, particular embodiments are not limited to any specific combination of hardware circuitry and/or software. In various embodiments, the term "logic" means any combination of software or hardware that is used to implement all or part of particular embodiments disclosed herein.

The term "computer readable medium" or "computer usable medium" as used herein refers to any medium that participates in providing instructions to processor 208 for execution. Such a medium may take many forms, including but not limited to, nonvolatile media and volatile media. Non-volatile media includes, for example, optical or magnetic disks, such as static storage 204 or dynamic storage 206. Volatile media includes dynamic memory, such as memory 202.

Computing system 200 may transmit and receive messages, data, and instructions, including program, e.g., application code, through communications link 218 and communications interface 216. Received program code may be executed by processor 208 as it is received, and/or stored in static storage 204 or dynamic storage 206, or other storage for later execution. A database 214 may be used to store data accessible by the computing system 200 by way of data interface 212. In various examples, communications link 218 may communicate with, for example, user devices to display user interfaces to the on call coordination system 102.

Figure 4:
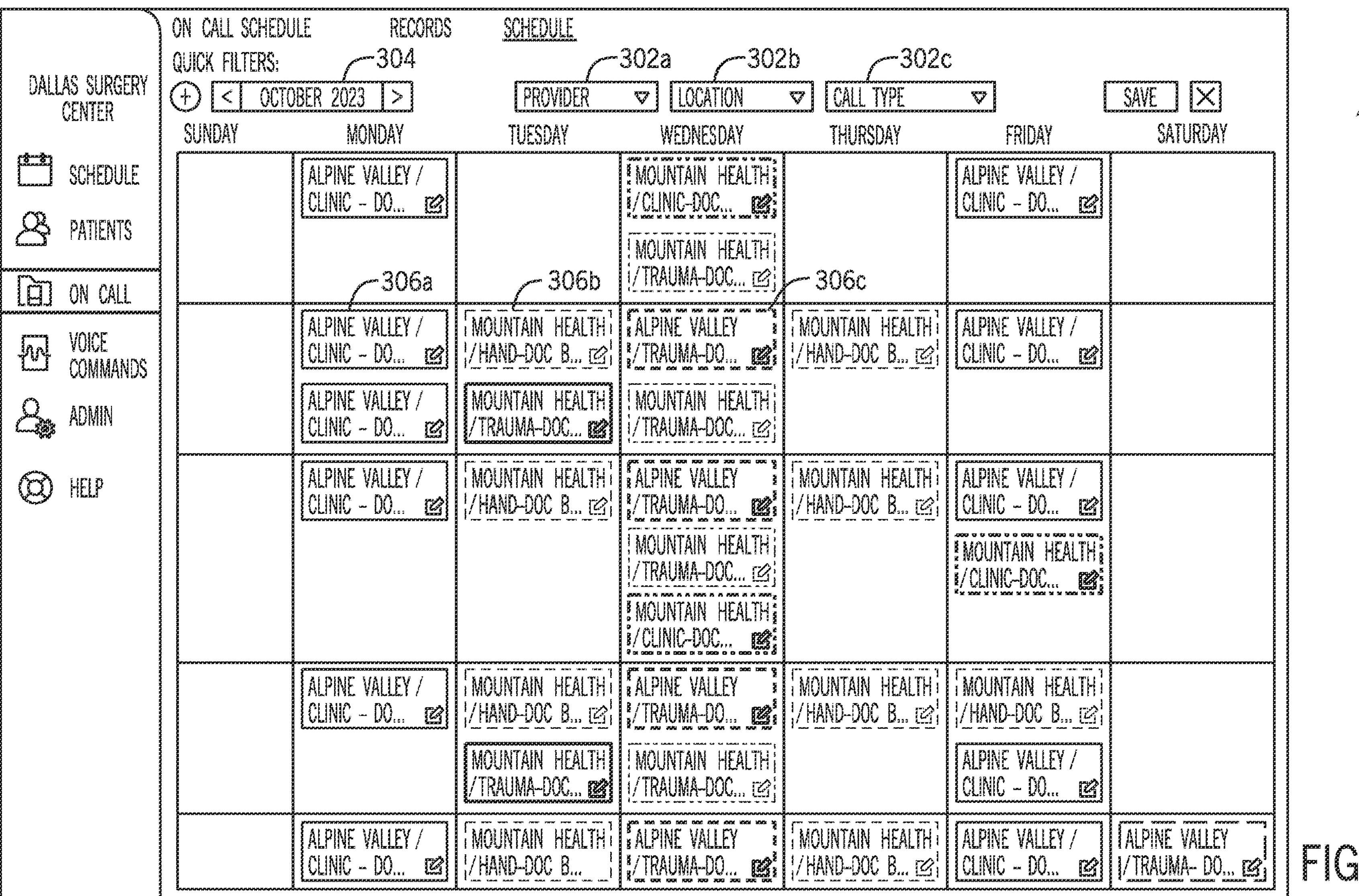
FIG. 4 shows an example user interface showing an on call schedule in accordance with various embodiments of the disclosure.

FIG. 4 illustrates an example user interface 300 showing an on call schedule. The user interface 300 may generally be formatted by the on call coordination system 102 (e.g., user interface configuration 126) responsive to a request to view the on call schedule received from a user device or via a management system. While the user interface 300 shows an on call schedule for a clinic or medical practice, similar on call schedules may be generated for an on call location, a particular provider, or using other filters.

The user interface 300 may include elements 302*a*-302*c* which may be used to select various filters for generating the on call schedule. Such elements may be, for example, drop down menus, free form text boxes to perform searches, and the like. For example, element 302*a* may be used to select a particular provider or several providers. When one provider is selected, the on call schedule shown in the user interface 300 may show on call events for only the selected provider. Similarly, element 302*b* may be used to filter the on call schedule by on call location. Element 302*c* may be used to filter the on call schedule by call type. Call type may include, for example, a particular specialty. In some examples, additional elements may include the options to filter by clinic or medical practice. Such filters may allow for viewing of portions of a schedule which may help to determine, for example, if the on call schedule is complete for a particular specialty or whether additional on call events should be added to the on call schedule to provide coverage for a specialty. Similarly, filtering by provider may allow a clinic administrator or individual provider to view a schedule without on call events for other providers included.

The user interface 300 may further include an element 304 allowing a user to select a time period for viewing an on call schedule. For example, a user may select a relevant month for an on call schedule. In some examples, the user may further select a different time interval for viewing. For example, a user may view an on call schedule for a week, two weeks, a particular day, and the like.

As shown in the user interface 300, on call events (e.g., on call events 306*a*-306*c*) may be shown as boxes, bars, or other geometrically shaped icons on particular days within a calendar. In other examples, on call events may be shown with different symbols, such as shapes, colored text, and other symbols. The on call events may, in some examples, be color coded to reflect some information about the on call event. In some examples, color may serve as a visual indicator or aesthetic theme that is used to visually group on call events. For example, in an on call schedule viewed by a clinic or medical practice, on call events may be color coded based on the on call location served by the on call event. Similarly, in an on call schedule viewed by an on call location, on call events may be color coded based on the clinic or medical practice associated with the on call event. In various examples, on call events may be color coded based on other characteristics, such as providers associated with the on call event, specialties associated with the on call event, and the like; the color coding of on call events may be determined by the user, clinic, or on call location preferences On call events may be otherwise distinguished using, for example, matching patterns, symbols, or the like. As shown in the user interface 300, the on call events may be shown with some information about the event, such as the location of the on call event. In such examples, the colors or other visual indicators associated with on call events, clinics, on call locations, and/or providers may be stored as a characteristic in the corresponding schedule data 118, clinic data 130, location data 132, and/or provider data 134.

In some examples, additional information about the on call events may be displayed when a user hovers over or selects an on call event in the on call schedule. For example, the user interface 400 shown in FIG. 5 includes a detail view 408 for an on call event 406*d*. The detail view 408 may, in some examples be color coded to match the on call event 406*d*. For example, the detail view 408 may include an edge colored to match the color of the on call event 406*d*. In other examples, the detail view 408 may otherwise correlate with the on call event 406*d*. For example, the detail view may include other visual indicators such as patterns or symbols which match the patterns or symbols of the on call event 406*d*. In such examples, the colors or other visual indicators which are displayed in the detail view 408 may be determined by referencing the color or visual indicator characteristic of the corresponding on call event 406*d* which may be stored in the schedule data 118, clinic data 130, location data 132, and/or provider data 134.

The detail view 408 may display additional information about the on call event 406*d*, such as the on call location, the call type (e.g., specialty), and the provider associated with the on call event 406*d*. In various examples, the information about the provider may include contact information for the provider. Accordingly, providers may be reached more quickly during an on call event. For example, with paper calendars or schedules, a charge nurse may have to look up a provider's contact information in another location when the on call provider is needed. Using the on call schedule, a charge nurse (or other person responsible for contacting on call providers) may identify the on call provider and obtain contact information in one user interface 400, leading to more efficient patient care.

Figure 6:
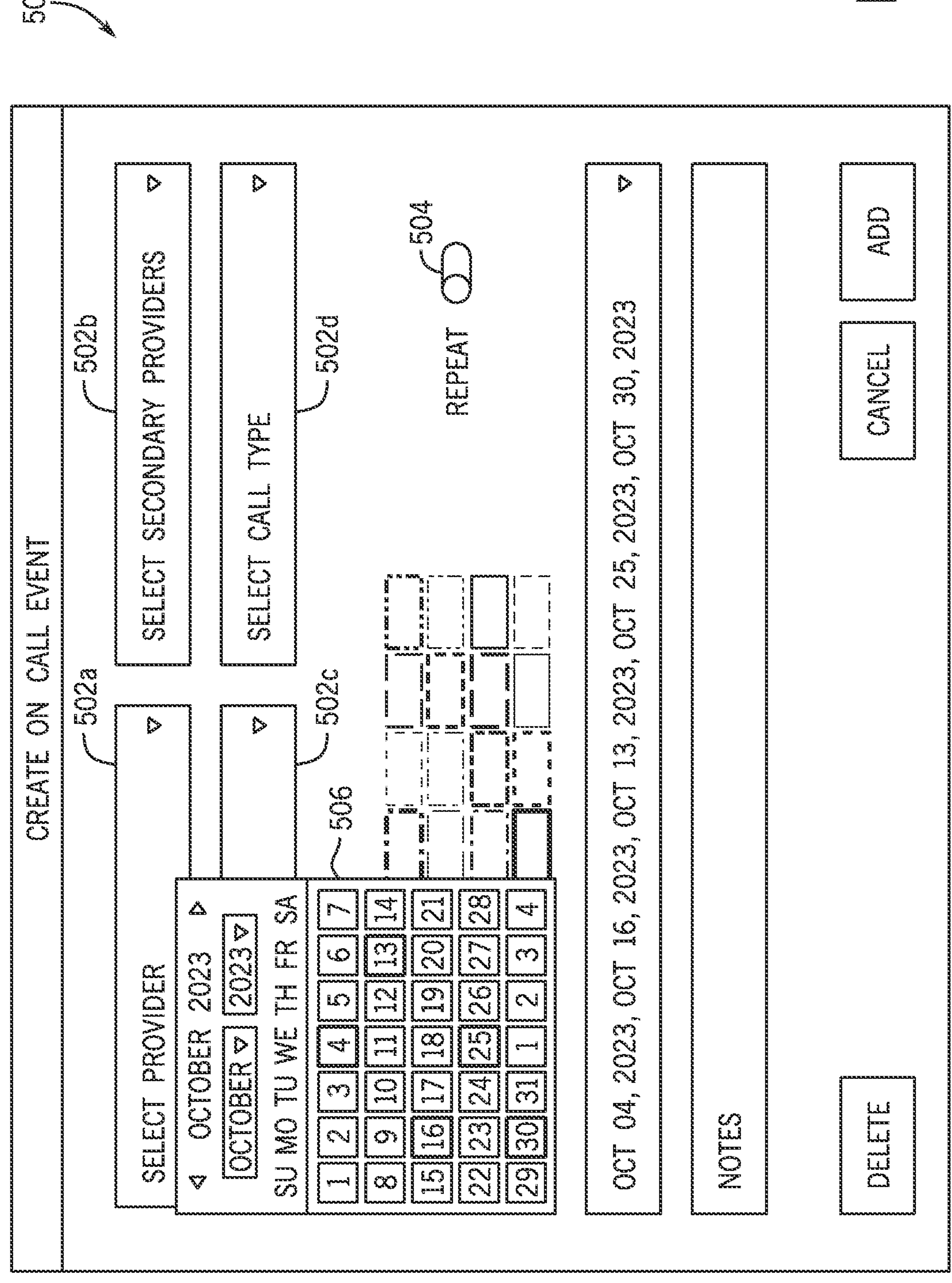
FIG. 6 shows an example user interface for creating an on call event in accordance with various embodiments of the disclosure.

FIG. 6 illustrates an example user interface 500 for creating an on call event. The user interface 500 may be accessed, for example, at a clinic user device 112 by an administrator creating an on call event on behalf of a provider. The user interface 500 may generally include fields or other elements for providing information about an on call event to the on call coordination system 102, such as a primary provider, secondary provider (if applicable), type of call (e.g., a specialty associated with the on call event), an on call location, and the like. For example, the user interface 500 includes elements 502*a*-502*d* for adding information about the on call event, shown as drop down menus. The user interface 500 may further include options to select a color associated with the on call event, which may affect how the event is displayed in an on call schedule, such as those shown in user interfaces 300 and 400. In some examples, instead of selecting colors associated with the event, colors may be automatically formatted based on other information about the event, such as the type of call, provider associated with the on call event, the on call location, and the like.

In various examples, the user interface 500 may further include elements to configure an on call event as part of a series, or to create multiple on call events in a series in one action. For example the user interface 500 includes a slider 504 which allows the user to select an option to repeat the on call event. The user interface 500 further includes a calendar 506 allowing the user to select dates for recurrence of the on call event. Accordingly, a user may add a series of on call events which do not occur at regular intervals but otherwise have the same characteristics.

Figure 7:
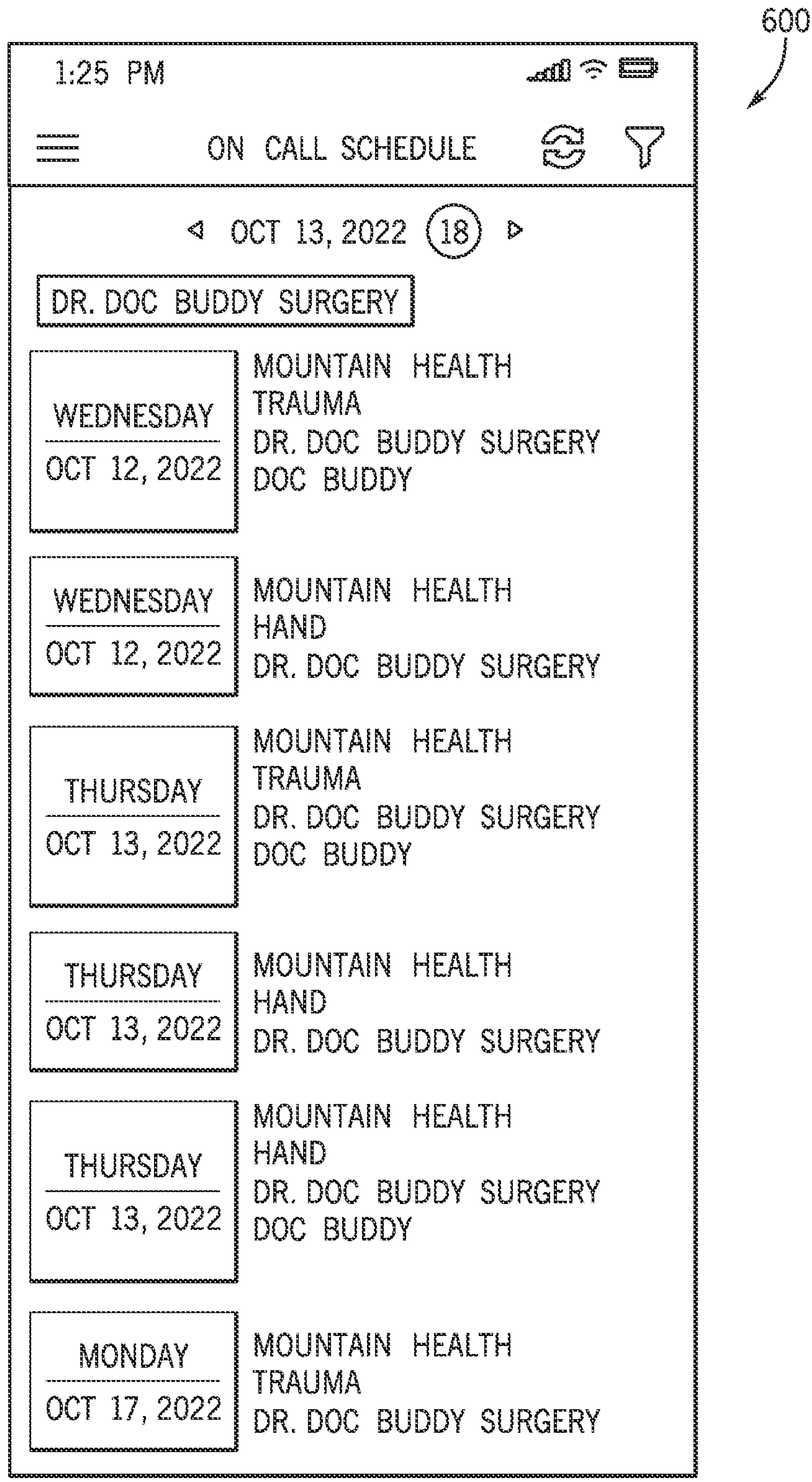
FIG. 7 shows an example user interface showing an on call schedule at a provider device in accordance with various embodiments of the disclosure.

FIG. 7 illustrates an example user interface 600 showing an on call schedule at a provider device 116. In various examples, the user interface 600 may be generated by the on call coordination system 102 responsive to a request from the provider device 116. The user interface 600 may be displayed at the user interface 140 of the provider device 116. Generally, the on call schedule shown in the user interface 600 may show a series of on call events for a specific provider. The on call events may be shown in a list view, with additional details about the events, such as the date, time, on call location, and type of on call event. In some examples, on call events may be filtered by type of call, on call location, or other characteristics.

In some examples, the user interface 600 may allow a provider to edit or request changes to upcoming on call events through the provider device 116. For example, a provider may select an on call event and request to trade the on call event with another provider (e.g., have another provider claim the selected on call event and claim another on call event in return). Such requests may be automatically approved upon acknowledgement from both providers or may go through an administrator or other user associated with a medical group or on call location before final approval.

Figure 8:
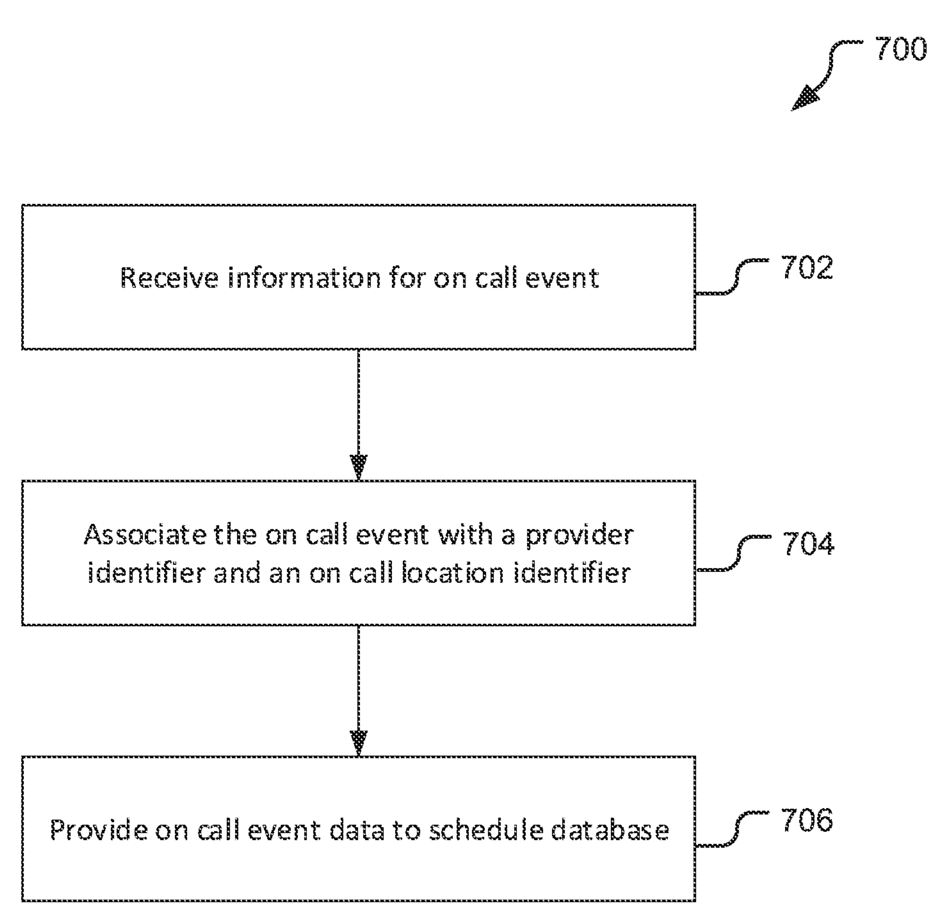
FIG. 8 is a flow diagram of an example method for creating an on call event in an on call coordination system, in accordance with various embodiments of the disclosure.

FIG. 8 is a flow diagram of an example method 700 for creating an on call event in the on call coordination system 102. At block 702, the on call coordination system 102 receives information for an on call event. In various examples, the on call coordination system 102 may receive such information from a clinic user device 112 or from an on call location device 114, either via a clinic practice management system 104, an on call location management system 108 or directly from the clinic user device 112 or from the on call location device 114. In various examples, the information for an on call event may be a request for a new on call event or a change or update to an existing on call event. For example, the on call coordination system 102 may receive a request for a new on call event via a user interface 136 of the clinic device 112, such as the user interface 500. In some examples, the request for a new on call event may be received directly from a provider device 116. The information about the on call event may be received at the management system interface 124 and/or user interface configuration 126 of the on call coordination system 102 depending on how the various devices (e.g., the clinic user device 112, provider device 116, on call location device 114, and/or other devices) are configured to access the on call coordination system 102.

In various examples, the information for the on call event may include a provider, an on call location, a clinic or medical practice associated with the provider, a date and time for the on call event, and a call type or specialty for the on call event. Information for the on call event may, in some examples, also include back-up providers, an indication that the on call event is part of a series of events (e.g., including additional dates for the on call event for other on call events in the series), a color or other marker to be associated with the on call event, and the like.

The on call coordination system 102 associates the on call event with a provider identifier and an on call location identifier at block 704. For example, after a request for an on call event is received at the on call coordination system 102, schedule configuration 128 may associate the on call event with a provider identifier based on information about the provider received with the request for the event. Schedule configuration 128 may further associate the on call event with a clinic or practice identifier, an on call location identifier, and/or other identifiers based on the information received with the request for the on call event.

At block 706, the on call coordination system 102 provides on call event data to a schedule database 118. Generally, on call event data may include the identifiers associated with the on call event at block 704 and other information about the on call event, such as the date and time of the on call event, whether the on call event is part of a series, the type of call or specialty for the call, and the like.

Figure 9:
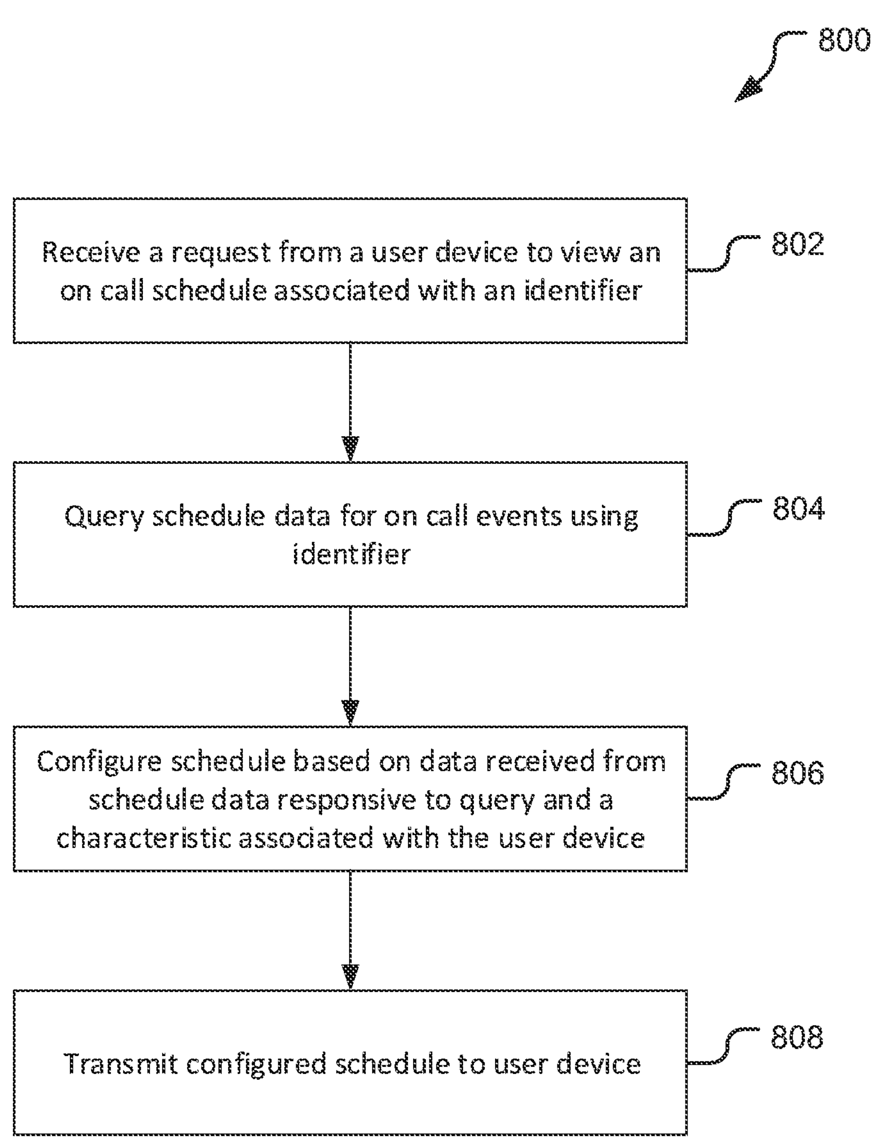
FIG. 9 is a flow diagram of an example method for configuring and viewing an on call schedule from an on call coordination system, in accordance with various embodiments of the disclosure.

FIG. 9 is a flow diagram of an example method 800 for configuring and viewing an on call schedule from the on call coordination system 102. At block 802, the on call coordination system 102 receives a request from a user device to view an on call schedule associated with an identifier. In various examples, the identifier may include an on call location identifier, a practice or clinic identifier, and/or a provider identifier. For example, a clinic user device 112 may request to view an on call schedule associated with the clinic identifier to view an on call schedule for all clinic providers for a specified period of time. In another example, an on call location device 114 may view an on call schedule showing all on call events for the on call location.

At block 802, the on call coordination system 102 may receive further parameters along with the identifier. For example, the request may include a clinic identifier and a period of time (e.g., a month, a week, or other time period) for on call events. In some examples, other parameters may include the type of call or specialty of the call, status of the on call event (e.g., pending request or confirmed event), or other parameters. In some examples, the on call coordination system 102 may receive multiple identifiers at block 802. For example, the request may be a request to view on call events for a particular provider (associated with a provider identifier) at a particular on call location (associated with a location identifier).

In some examples, the request for the on call schedule may further include end permissions, delivery method, or other parameters for the on call schedule. For example, end permissions may specify groups of users who are able to access and view the on call schedule or varying levels of information about the on call events in the on call schedule. Such end permissions may be specified by a user requesting the on call schedule and/or may be implied by permissions granted to the user requesting the on call schedule. Delivery method may include, for example, an option to generate an on call schedule that may be shared with users without access to the on call coordination system 102 through, for example, a universal resource locator (URL) or other link. In some examples, such on call schedules may be password protected or access to such schedules may be otherwise restricted.

The on call coordination system 102 queries schedule data 118 for on call events using the received identifier at block 804. Schedule configuration 128 may, after receiving one or more identifiers for an on call schedule, query schedule data 118 to retrieve on call events associated with the identifiers. For example, where a request is for a clinic or medical group identifier, schedule configuration 128 may pull all on call events from schedule data 118 associated with the medical group identifier. In some examples, in addition to pulling data for the on call event, schedule configuration 128 may access provider data 134, location data 132, and/or clinic data 130 to pull additional information used to populate an on call schedule. For example, schedule configuration 128 may, using a provider identifier received with the on call event data, obtain contact information for the provider from provider data 134. Such provider data may be used, for example, to populate detailed views of an on call schedule, such as on call event detail 408 shown in the user interface 400.

At block 806, the on call coordination system 102 configures the schedule based on data received from the schedule data 118 responsive to the query and a characteristic associated with the user device. For example, user interface configuration 126 may receive various data regarding on call events from schedule configuration 128 and may use such information to populate an on call schedule. In some user interface configuration 126 may format an on call schedule based on a characteristic of the user device requesting the schedule, such as permissions of a user associated with the user device, the type of device (e.g., a computer, tablet, or mobile device), the manner in which the device is connected to the on call coordination system 102 (e.g., accessing through a mobile application, web browser, or through a management system), and the like. For example, an on call schedule provided to a mobile device may include less detail than one provided to a desktop or laptop computer. In some examples, users with lower level permission to access the on call coordination system 102 may be able to view the on call schedule without specific information, such as provider contact information.

The on call coordination system 102 transmits a configured schedule to the user device at block 808. In some examples, the on call coordination system 102 may transmit a link or other way to share the on call schedule with the configured schedule to the user device requesting the schedule. In this manner, a clinic may be able to share an on call schedule with other entities, such as an on call location. Similarly, an on call location may be able to share an on call schedule with various clinics or medical practices and/or other providers who may or may not have access to the on call coordination system 102.

According to the above examples, the on call coordination system 102 may provide a centralized system for tracking on call schedules, providing coordination between medical practices, providers, and on call locations or facilities. With on call information more readily available, medical care may be improved and be quicker for patients at on call locations (e.g., hospitals) needing care from on call providers. Further, significant resources, both in terms of employee time and storage and processing resources, may be saved when providers, clinics, and on call locations utilize such a system to coordinate on call schedules.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method for generating and coordinating a centralized on call schedule of medical providers showing on call events, the method comprising:

receiving, at an on call coordination system, a request from a user device to view an on call schedule associated with an identifier, wherein the identifier is associated with a time and a date range and with at least one of one or more medical providers, one or more medical practices, one or more clinics, or one or more on call locations;

querying, by the on call coordination system, schedule data for on call events using the identifier received with the request, wherein the schedule data centrally stores on call events associated with the one or more medical providers, the one or more medical practices, the one or more clinics, and the one or more on call locations, the on call event defining a requirement, associated with the identifier, to be available to provide medical services for an unscheduled patient for a period during the time and date range of the on call schedule;

configuring the on call schedule based on the on call events received from the schedule data responsive to the query, wherein the on call schedule is further configured based on a characteristic associated with the user device;

further configuring the on call schedule according to a user interface configuration which may format the on call schedule according to characteristics of the on call events by presenting the on call events with different visual indicators based at least on the one or more medical providers, the one or more medical practices, the one or more clinics, or the one or more on call locations, wherein the on call events include a first on call event presented with a first visual indicator and a second on call device presented with a second visual indicator that differs from the first visual indicator; and transmitting the configured schedule to the user device.

2. The method of claim 1, wherein in a first configuration, the identifier comprises an identifier for a medical practice, wherein the on call schedule in the first configuration includes on call events associated with the medical practice at at least one of the one or more on call locations, at least one of the one or more clinics, or at least one of the one or more medical providers, in a second configuration, the identifier comprises an identifier for an on call location, wherein the on call schedule in the second configuration includes on call events associated with the on call location and at least one of the one or more medical practices, at least one of the one or more clinics, or at least one of the one or more medical providers, in a third configuration, the identifier comprises an identifier for a medical provider, wherein the on call schedule includes on call events associated with the medical provider and at least one of the one or more medical practices, at least one of the one or more clinics, or at least one of the one or more on call locations, and in a fourth configuration, wherein the identifier comprises an identifier for a clinic, wherein the on call schedule includes on call events associated with the clinic and at least one of the one or more medical practices, at least one of the one or more on call locations, or at least one of the one or more medical providers.

3. The method of claim 1, wherein the request is a request to view the on call schedule associated with the identifier and at least one additional identifier, wherein querying the schedule data for on call events includes identifying on call events in the schedule data associated with the identifier and any additional identifiers.

4. The method of claim 1, wherein configuring the on call schedule further includes querying provider data to obtain contact information of at least one of the one or more medical providers associated with the on call events received from the schedule data.

5. The method of claim 1, wherein configuring the on call schedule further includes querying on call location data to obtain information about at least one of the one or more on call locations associated with the on call events received from the schedule data.

6. The method of claim 1, wherein configuring the on call schedule further includes querying clinic data to obtain information about at least one of the one or more clinics associated with the on call events received from the schedule data.

7. The method of claim 1, further comprising:

receiving, at an on call coordination system, a request from a user device or medical management system to create an on call event or schedule associated with an identifier;

creating, by the on call coordination system, an on call event or schedule using the identifier received with the request, wherein the on call event or schedule is may be associated with one or more medical providers, one or more medical practices, one or more clinics, one or more on call locations, or a time and date range; and storing the on call event or schedule in a centralized schedule data.

8. One or more non-transitory computer readable media encoded with instructions which, when executed by one or more processors of an on call coordination system, cause the on call coordination system to:

receive a request from a user device to view an on call schedule associated with an identifier, wherein the identifier is associated with a time and date range and at least one or more medical providers, one or more medical practices, one or more clinics, or one or more on call locations;

query schedule data for on call events using the identifier received with the request, wherein the schedule data centrally stores on call events associated with the one or more medical providers, the one or more medical practices, the one or more clinics, and the one or more on call locations, the on call event defining a requirement, associated with the identifier, to be available to provide medical services for an unscheduled patient for a period during the time and date range of the on call schedule;

configure the on call schedule based on the on call events received from the schedule data responsive to the query, wherein the configuring the on call schedule comprises configuring the on call schedule according to characteristics of the on call events by presenting the on call events with different visual indicators based at least on the one or more medical providers, the one or more medical practices, the one or more clinics, or the one or more on call locations, wherein the on call events include a first on call event presented with a first visual indicator and a second on call device presented with a second visual indicator that differs from the first visual indicator;

transmit the configured schedule to the user device;

receive, from the user device, a selection of a particular on call event; and responsively provide a detailed view of the particular on call event, the detailed view including at least a provider and contact information for the provider associated with the particular on call event, wherein the detailed view is configured to present an edge of the detailed view with a same visual indicator as the particular on call event.

9. The non-transitory computer readable media of claim 8, wherein the request is a request to view an on call schedule associated with an identifier and at least one other identifier, wherein querying the schedule data for on call events includes identifying on call events in the schedule data associated with the identifier and any additional identifiers.

10. The non-transitory computer readable media of claim 8 further comprising encoded instructions which, when executed by one or more processors of an on call coordination system, cause the on call coordination system to:

receive a request from a user device to create an on call event or schedule associated with an identifier;

create an on call event or schedule using the identifier, wherein the on call event or schedule is associated with one or more medical providers, one or more medical practices, one or more clinics, one or more on call locations, or a time and date range; and transmit the on call event or schedule to the schedule data.

11. A system for generating and coordinating a centralized on call schedule of medical providers comprising:

a schedule data storage system for storing a plurality of on call events and schedules assembled from one or more medical practices, one or more clinics, one or more on call locations, or one or more medical providers; and one or more computing resources comprising:

a non-transitory memory component for storing a plurality of clinic data, on call location data, and medical provider data; and one or more processors in electronic communication with the memory and configured by instructions from the memory to perform the following operations:

receive a request from a user device to view an on call schedule associated with at least one identifier;

query schedule data for on call events using the identifier which is associated with a time and date range and with the one or more medical providers, the one or more medical practices, the one or more clinics, or the one or more on call locations, the on call event defining a requirement, associated with the identifier, to be available to provide medical services for an unscheduled patient for a period during a time and date range of the on call schedule;

configure the on call schedule based on the on call events received from the schedule data responsive to the query, wherein the on call schedule is further configured based on a characteristic associated with the user device;

further configure the on call schedule according to a user interface configuration which may format the on call schedule according to characteristics of the on call events by presenting the on call events with different visual indicators based at least on the one or more medical providers, the one or more medical practices, the one or more clinics, or the one or more on call locations, wherein the on call events include a first on call event presented with a first visual indicator and a second on call device presented with a second visual indicator that differs from the first visual indicator; and transmit the configured schedule to the user device.

12. The system of claim 11, wherein the user device is a provider device and the identifier is for a medical provider, wherein the on call schedule includes on call events associated with the medical provider for at least one of the one or more medical practices, at least one of one or more clinics, or at least one of the one or more on call locations.

13. The system of claim 11, wherein the user device is a clinic user device and the identifier is for a clinic, wherein the on call schedule includes on call events associated with the clinic for at least one of the one or more medical practices, at least one of the one or more on call locations, or at least one of the one or more medical providers.

14. The system of claim 11, wherein the user device is an on call location device and the identifier is for an on call location, wherein the on call schedule includes on call events associated with the on call location for at least one of the one or more medical practices, at least one of the one or more clinics, or at least one of the one or more medical providers.

15. The system of claim 11, wherein the user device may communicate with the one or more computing resources to create on call events or schedules associated with one or more of a medical practice, clinic, on call location, or medical provider, wherein the on call event or schedule is then stored in the schedule data storage system.

16. The system of claim 11, wherein a medical management system may communicate with the user device and with the one or more computing resources to create on call events or schedules associated with one or more of a medical practice, clinic, on call location, or medical provider, wherein the on call event or schedule is then stored in the schedule data storage system.

17. The system of claim 11, wherein requests to view on call schedules may include querying the clinic data, on call location data, and medical provider data storage for information regarding the one or more clinics, the one or more on call locations, and the one or more medical providers associated with the on call schedule.

18. The system of claim 17, wherein the medical provider data includes the one or more clinics the one or more providers are associated with, the one or more on call locations the one or more providers are associated with, the one or more medical practices the one or more providers are associated with, specialties of the one or more providers, contact information for the one or more providers, and general availability of the one or more providers.

* * * * *